United States Patent
Huang

(10) Patent No.: US 8,306,545 B2
(45) Date of Patent: Nov. 6, 2012

(54) METHOD AND SYSTEM FOR REASSIGNING TRAFFIC CHANNEL CONFIGURATION IN WIRELESS COMMUNICATION SYSTEM

(75) Inventor: Jun Huang, Beijing (CN)

(73) Assignee: Beijing Xinwei Telecom Technology Inc., Beijing (CN)

( * ) Notice: Subject to any disclaimer, the term of this patent is extended or adjusted under 35 U.S.C. 154(b) by 466 days.

(21) Appl. No.: 12/682,480

(22) PCT Filed: Oct. 10, 2008

(86) PCT No.: PCT/CN2008/072645
§ 371 (c)(1),
(2), (4) Date: Apr. 9, 2010

(87) PCT Pub. No.: WO2009/049543
PCT Pub. Date: Apr. 23, 2009

(65) Prior Publication Data
US 2010/0210278 A1   Aug. 19, 2010

(30) Foreign Application Priority Data

Oct. 10, 2007 (CN) .......................... 2007 1 0175701

(51) Int. Cl.
*H04Q 7/20* (2006.01)
(52) U.S. Cl. ...................... 455/450; 455/435.1; 455/436; 455/439; 455/452.2; 455/452.1
(58) Field of Classification Search ................... 455/450
See application file for complete search history.

(56) References Cited

U.S. PATENT DOCUMENTS

2004/0190471 A1 * 9/2004 Bender et al. ................. 370/329

FOREIGN PATENT DOCUMENTS

| CN | 1678115 A | 10/2005 |
|---|---|---|
| CN | 1984468 A | 6/2007 |
| CN | 101026867 A | 8/2007 |
| WO | WO 2007/062544 A1 | 6/2007 |

OTHER PUBLICATIONS

International Search Report (PCT/ISA/210) dated Jan. 15, 2009.

* cited by examiner

*Primary Examiner* — Olumide T Ajibade Akonai
*Assistant Examiner* — Randy Peaches
(74) *Attorney, Agent, or Firm* — Buchanan Ingersoll & Rooney PC

(57) ABSTRACT

Embodiments of the present invention provide a method and system for reassigning traffic channel configuration, which is applicable to reassigning traffic channel configuration between a site A and a site B with the reassignment being initiated by the site A. The site A transmits a reassignment message to the site B, where the reassignment message carries reassigned traffic channel configuration. The site B determines whether the reassignment message is received correctly, and processes traffic data and transmits the traffic data to the site A according to a determining result. The site A processes the traffic data, and determines whether the reassignment message is correctly received by the site B through determining whether the traffic data are correct. The method and the system enable a base station to determine whether a terminal correctly receives a reassignment message without the terminal transmitting an acknowledgement message, which guarantees fluent communications between the two parties.

12 Claims, 3 Drawing Sheets

METHOD AND SYSTEM FOR REASSIGNING TRAFFIC CHANNEL CONFIGURATION IN WIRELESS COMMUNICATION SYSTEM

FIELD OF THE INVENTION

The present invention relates to wireless communication systems, and particularly, to a method and system for reassigning traffic channel configuration in a wireless communication system.

BACKGROUND OF THE INVENTION

In wireless communication systems, traffic channel configuration is used for designating various parameters adopted by downlink/uplink traffic channels, such as coding scheme, coding rate and modulating scheme. Based on specific traffic channel configuration, a downlink/uplink physical layer processes baseband data and transmits the processed data through the traffic channels.

In conventional wireless communication systems, traffic channel configuration reassignment is acknowledged and confirmed in a handshake manner. When a base station (BS) needs to reassign the downlink/uplink traffic channel configuration, the BS firstly specifies traffic channel configuration with a set of parameters, and loads the traffic channel configuration into a reassignment message which is then transmitted to a terminal. If the terminal parses the reassignment message correctly, the terminal uploads an acknowledgment message to the BS, and records reassigned traffic channel configuration information for receiving or transmitting traffic data.

FIG. 1 is a flowchart illustrating a conventional method for reassigning traffic channel configuration. As shown in FIG. 1, according to a conventional reassignment method, either of the following two situations may occur after a terminal sends an acknowledgment message:

Situation 1, as shown in FIG. 1(a), if the acknowledgment message received by a BS is correct, the BS will use the reassigned traffic channel configuration to receive and transmit traffic data;

Situation 2, as shown in FIG. 1(b), if the acknowledgment message received by the BS is incorrect or the BS does not receive the acknowledgment message, the BS will retransmit the reassignment message until it receives a correct acknowledgment message from the terminal or a timer expires.

According to the above conventional reassignment method, even if the terminal has correctly received the reassignment message, if the acknowledgment message sent by the terminal is lost or damages due to environmental impact, the BS will mistakenly treat the terminal as failing to receive the reassignment message, and thus will continue to transmit the reassignment message to the terminal, which incurs irrecoverable hamper to normal communications.

SUMMARY OF THE INVENTION

In view of the above, embodiments of the present invention provide a method for reassigning traffic channel configuration, which could avoid a reassignment failure due to loss or error of an acknowledgment message An embodiment of the present invention provides a method for reassigning traffic channel configuration, which is applicable to reassigning traffic channel configuration between a site A and a site B with the reassignment being initiated by the site A, and the method includes:

transmitting, by the site A, a reassignment message containing reassigned traffic channel configuration to the site B; determining, by the site B, whether the site B correctly receives the reassignment message, processing traffic data according to a determining result and transmitting the traffic data processed to the site A; processing, by the site A, the traffic data received, and determining whether the site B correctly receives the reassignment message through determining whether the traffic data are correct.

Preferably, the method further includes the steps of:

establishing communications between the site A and the site B through first traffic channel configuration, where respective states of the site A and the site B are set to be the same, SA and SB are sequence numbers of respective states of the site A and the site B; performing, by the site A and the site B, channel coding on respective messages to be sent to each other to generate encoded messages, where each encoded message includes a message part and a code part; mapping, by the site A and the site B, respective encoded messages according to function YA(SA) and function YB(SB), and transmitting mapped messages to each other, where the YA(SA) and the YB(SB) are respective functions of SA, the sequence number of the state of the site A, and SB, the sequence number of the state of the site B, and the YA(SA) and the YB(SB) are invertible mappings known by the site A and the site B; performing, by the site A and the site B according to function $YA^{-1}(SA)$ and function $YB^{-1}(SB)$, inverse mapping for the mapped messages received respectively, and then performing channel decoding on respective results of the inverse mapping.

The step of the site A transmitting the reassignment message to the site B includes:

transmitting, by the site A, the reassignment message, which carries reassigned traffic channel configuration for communication with the site B and which is processed through coding and mapping, to the site B through the first traffic channel configuration.

Another embodiment of the present invention provides a system for reassigning traffic channel configuration. The system includes a site A and a site B.

The site A is adapted to transmit a reassignment message to the site B, where the reassignment message carries reassigned traffic channel configuration; to process traffic data received from the site B, determine whether the traffic data received are correct to determine whether the reassignment message is correctly received by the site B. The site B is adapted to determine whether the reassignment message is correctly received, process the traffic data according to a determining result and transmit the traffic data to the site A.

Preferably, the site A may be a base station, and the site B may be a terminal.

According to embodiments of the present invention, reassignment failures due to loss or error of an acknowledgment message can be effectively avoided.

DETAILED DESCRIPTION OF THE INVENTION

Figure 1:
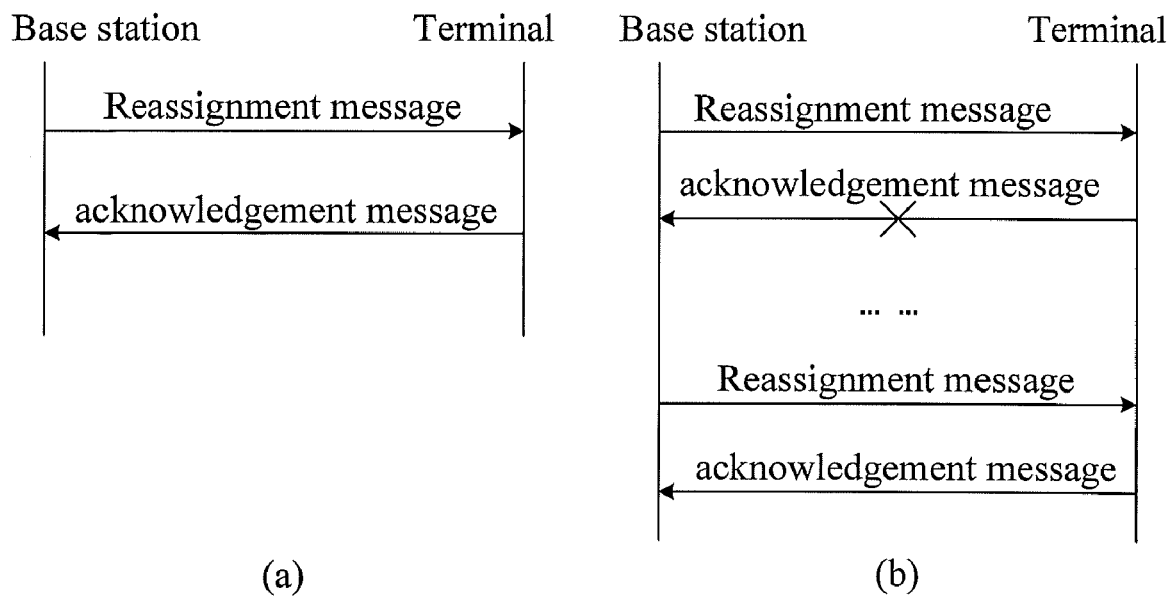
FIG. 1 is a flowchart illustrating a conventional method for reassigning traffic channel configuration, (a) illustrates a process when a BS correctly receives an acknowledgment message, (b) illustrates a process when the BS fails to correctly receive an acknowledgment message.

The present invention is hereinafter described in detail with reference to specific embodiments and the drawings to make the objective, technical solutions and advantages of the present invention clearer.

Embodiments of the present invention provide a method for reassigning traffic channel configuration, which is applicable to reassigning traffic channel configuration between two sites (e.g., reassigning traffic channel configuration between a site A and a site B, where the reassignment is initiated by the site A). According to the method, the site B does not have to send an acknowledgment message; instead, the site A determines whether the site B has correctly received a reassignment message by a certain means. Therefore, reassignment failures due to loss or error of an acknowledgment message can be avoided.

The method provided by an embodiment of the present invention mainly includes:

transmitting, by a site A, a reassignment message to a site B, where the reassignment message carries reassigned traffic channel configuration; determining, by the site B, whether the reassignment message is received correctly, processing traffic data and transmitting the traffic data to the site A according to a determining result; processing, by the site A, the traffic data received, and determining whether the site B has correctly received the reassignment message through determining whether the traffic data received is correct. The expression "the reassignment message is received correctly" means that the reassignment message received is correct, while the expression "the reassignment message is not received correctly" means that the reassignment message received is incorrect or the reassignment message is not received.

During this process, if determining that the site B has correctly received the reassignment message, the site B starts to communicate with the site A utilizing the reassigned traffic channel configuration after a time period determined in an agreement of the site A and the site B. Likewise, if the site A determines that the site B has correctly received the reassignment message, the site A starts to communicate with the site B utilizing the reassigned traffic channel configuration after the time period determined in an agreement of the site A and the site B.

In the above embodiment, the site A may be a base station and the site B may be a terminal.

In an embodiment of the present invention, the method for reassigning traffic channel configuration may include the following steps:

a, establishing, by the site A and the site B, communications with each other utilizing first traffic channel configuration; setting the site A and the site B in a same state, i.e. SA=SB, where the SA and the SB are sequence numbers of respective states of the site A and the site B;

b, performing, by the site A and the site B, channel coding on respective messages to be transmitted to each other to generate encoded messages, where each encoded message includes a message part and a code part;

c, mapping, by the site A and the site B, respective encoded messages utilizing functions YA(SA) and YB(SB), and transmitting mapped messages to each other; where the YA(SA) and the YB(SB) are respective functions of the sequence number of the state of the site A, SA, and the sequence number of the state of the site B, SB; where the YA(SA) and the YB(SB) are invertible mappings known by the site A and the site B;

d, after receiving the mapped messages, performing, by the site A and the site B, inverse mapping for the mapped messages utilizing functions of $YA^{-1}(SA)$ and $YB^{-1}(SB)$ respectively, and then performing channel decoding on respective results of the inverse mapping;

e, transmitting, by the site A through utilizing current traffic channel configuration, an encoded and mapped message of new channel configuration for communication with the site B (i.e. an encoded and mapped reassignment message carrying the reassigned traffic channel configuration) to the site B;

f, after performing the inverse mapping and decoding, changing, by the site B if it correctly receives the reassignment message, the state of the site B into SB+1, i.e. SB=SB+1; communicating, by the site B, with the site A utilizing the reassigned traffic channel configuration after a time period determined in an agreement of the site A and the site B;

g, communicating, by the site A, with the site B utilizing the reassigned traffic channel configuration after a time period determined in an agreement between the site A and the site B.

In the above embodiment, the traffic channel configuration may be bi-directional traffic channel configuration. In step f, the process of communicating by the site B with the site A utilizing the reassigned traffic channel configuration may include: transmitting, by the site B, traffic data utilizing the reassigned traffic channel configuration. In step g, the process of communicating by the site A with the site B utilizing the reassigned traffic channel configuration may include: communicating, by the site A, with the site B utilizing the reassigned traffic channel configuration after the site A determines that the traffic data received from the site B are correct.

According to another embodiment of the present invention, the method for reassigning traffic channel configuration may further include step h: reusing, by the site A, the current traffic channel configuration to communicate with the site B and reusing the previous sequence number of the state of the site A, i.e. SA=SA−1, after the site A determines that the traffic data received from the site B is incorrect, e.g. when the number of messages which are received from the site B and are correctly decoded utilizing the reassigned traffic channel configuration within a predetermined time period is smaller than a first predetermined threshold, or e.g. when the number of messages which are received from the site B and are correctly decoded within a predetermined time period utilizing the current traffic channel configuration is larger than a second predetermined threshold.

According to yet another embodiment of the present invention, in step b, the channel coding may be Reed-Solomon (RS) coding. In step c, the function YA(SA) is the same as the function YB(SB), and the mapping may be defined as: if the state S (SA or SB) is an odd number, keeping the message part unchanged and inverting each bit in the code part, or keeping the code part unchanged and inverting each bit in the message part; if the S is an even number, keeping the message part and the code part unchanged. The predetermined time period in step h is the time taken for interaction between the site A and the site B for 3 times.

According to another embodiment of the present invention, the time period determined in an agreement of the site A and the site B in step f is the time taken for transmission from the site B to the site A for one time; the time period determined in an agreement of the site A and the site B in step g is the time taken for transmission from the site B to the site A for one time plus the time taken for transmission from the site A to the site B for one time.

The method for reassignment provided by embodiments of the present invention is applicable to two sites requiring reassigning traffic channel configuration in a wireless communication system. According to an embodiment of the present invention, the method for reassignment will be described according to an example in which the reassignment is between two sites, a BS and a terminal, in a SCDMA broadband wireless access system. However, the method of the present invention should not be limited to the SCDMA system.

In the SCDMA broadband wireless access system, an RS coding scheme is applied to baseband channel coding.

Firstly, the transmission of a reassignment message is described.

Figure 2:
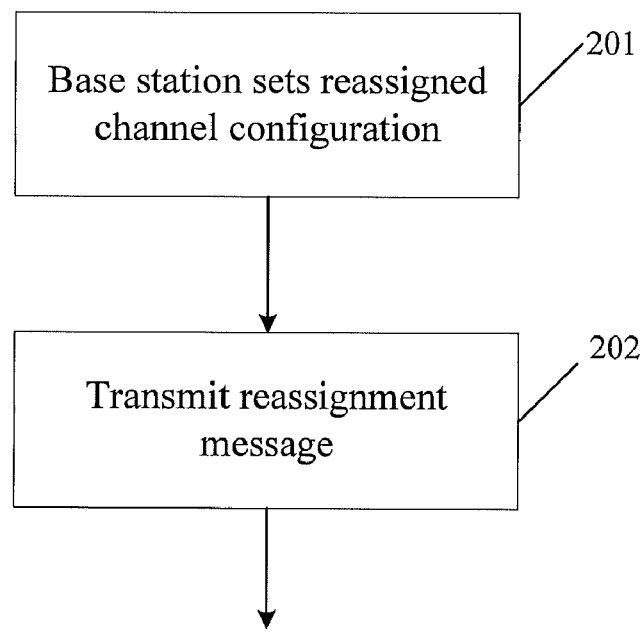
FIG. 2 is a flowchart illustrating a process of an SCDMA broadband wireless access system transmitting a reassignment message in accordance with an embodiment of the present invention.

FIG. 2 is a flowchart illustrating a process of an SCDMA broadband wireless access system transmitting a reassignment message. As shown in FIG. 2, when requiring reassigning downlink/uplink traffic channel configuration, a BS may perform the following steps.

In step 201, the BS configures parameters of traffic channel configuration.

In step 202, the BS loads the parameters of the traffic channel configuration into a reassignment message and transmits the reassignment message to a terminal.

So far, the process for transmitting the reassignment message is completed.

Next, the receiving of a reassignment message is described.

Figure 3:
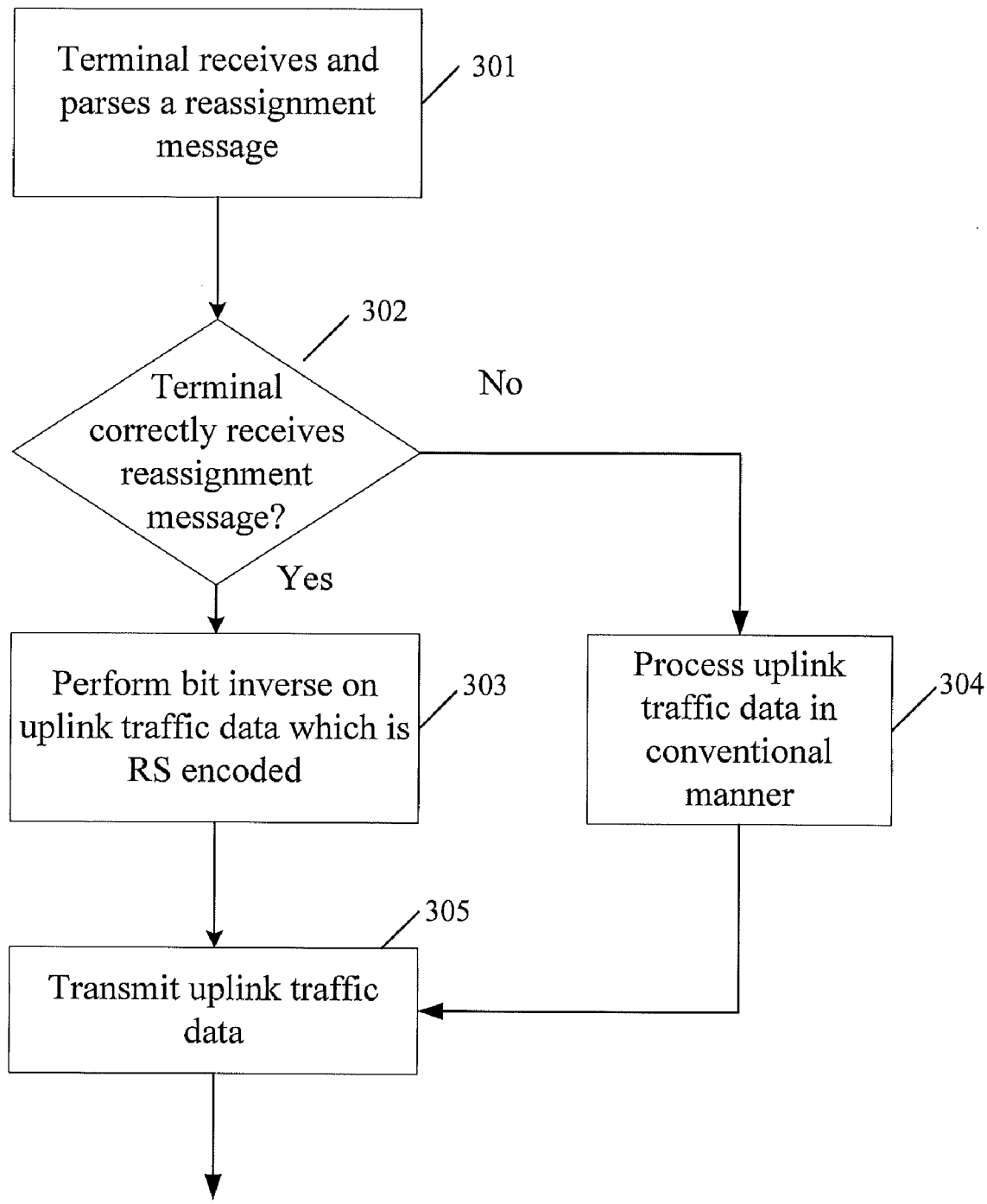
FIG. 3 is a flowchart illustrating a process of an SCDMA broadband wireless access system receiving a reassignment message in accordance with an embodiment of the present invention.

FIG. 3 is a flowchart illustrating a process of an SCDMA broadband wireless access system receiving a reassignment message. As shown in FIG. 3, a terminal receives a reassignment message through the following steps.

In step 301, the terminal receives a message from the BS, parses the message to determine whether the message is a reassignment message.

In step 302, the terminal determines whether the reassignment message is correctly received according to a parsing result. In other words, if a reassignment message is obtained by parsing the message, the terminal determines that the terminal has correctly received the reassignment message; otherwise, the terminal fails to correctly receive the reassignment message, i.e. the terminal does not receive a reassignment message or the message received is incorrect.

If the reassignment message is correctly received by the terminal, the terminal performs special processing in step 303 on to-be-transmitted uplink traffic data, e.g. performing channel coding on baseband data at the physical layer of the terminal to generate code blocks, and inverting each bit in an output bit steam of each code block; other processing procedures are similar to conventional processing procedures. The special processing may be extended to include the mapping of encoded traffic data or messages through utilizing a mapping scheme known by the BS and the terminal, e.g. mapping encoded traffic data or messages according to a function of YB(SB). The inverting each bit in an output bit stream of each code block is merely a mapping scheme easier to be implemented.

If the terminal does not correctly receive the reassignment message, the terminal processes uplink traffic data in step 304 in existing manner.

In step 305, the terminal transmits processed traffic data through an uplink traffic channel.

Finally, the determining whether the reassignment is successful is described.

Figure 4:
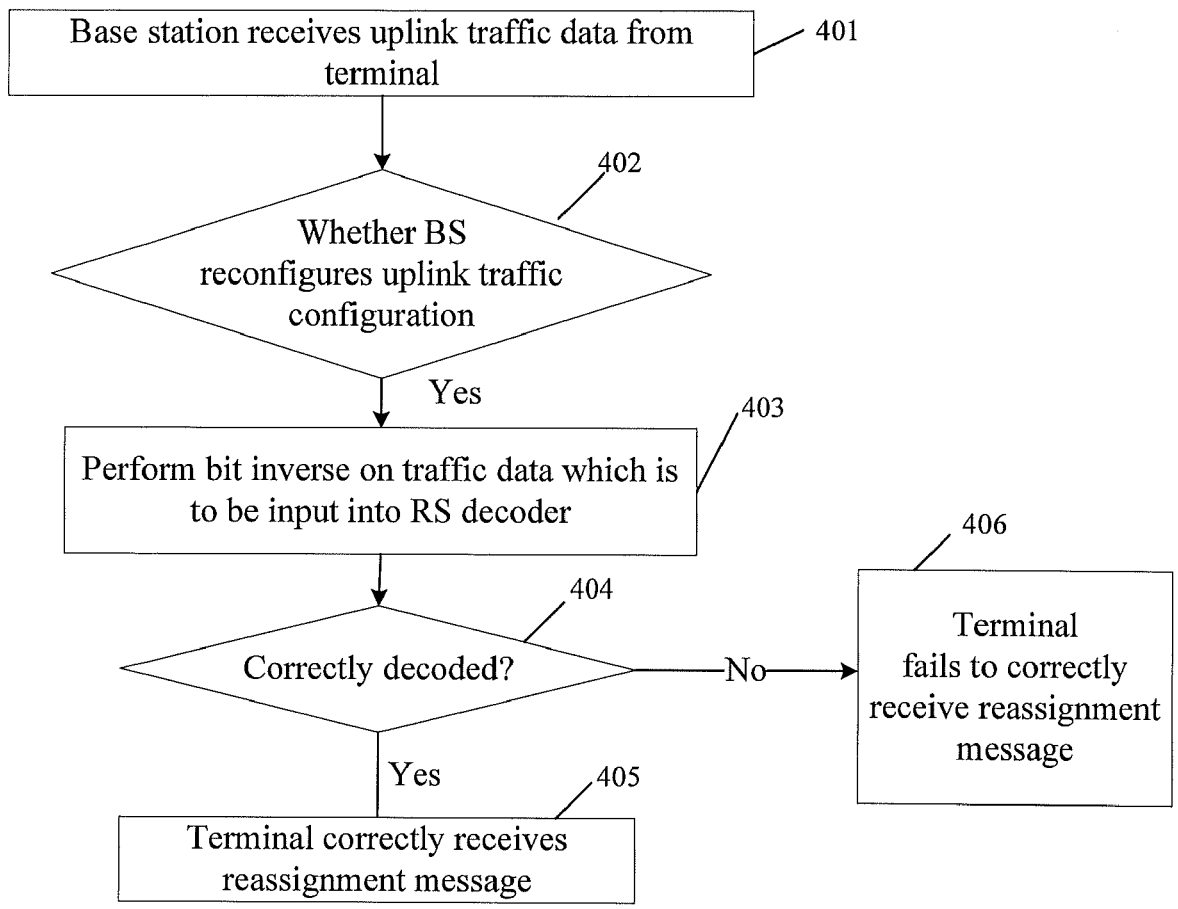
FIG. 4 is a flowchart illustrating a process of an SCDMA broadband wireless access system checking reassignment in accordance with an embodiment of the present invention.

FIG. 4 is a flowchart illustrating a process of an SCDMA broadband wireless access system checking reassignment. As shown in FIG. 4, the BS receives uplink traffic data from the terminal in step 401, and determines whether the BS has reassigned uplink traffic channel configuration in step 402. In this embodiment, suppose that the BS has reassigned the uplink traffic channel configuration, the process of determining whether the terminal has correctly received the reassignment message is performed and specifically includes the following steps:

In step 403, invert each bit in traffic data. To be specific, when the traffic data reach a decoder or encoder of the BS, each bit of an input bit stream is firstly inverted and then is inputted into the decoder to be decoded. The bit inverting may be regarded as a process of inverse mapping on the data or messages received.

In step 404, determine whether the bit stream is decoded correctly. If the bit stream is decoded correctly, it is determined in step 405 that the reassignment message is correctly received by the terminal; otherwise, it is determined in step 406 that the reassignment message may be incorrectly received by the terminal and that the reassignment fails.

In this embodiment, the bit inverting may not be performed on traffic data in step 403; instead, the step 404 is directly performed where the input bit stream is directly inputted into the decoder so as to determine whether the bit stream is decoded correctly. If the bit stream is decoded correctly, it is determined that the reassignment fails, and the terminal maintains traffic channel configuration prior to the reassignment (i.e. previous traffic channel configuration). Thus, the BS should also restore the previous traffic channel configuration.

In practice, due to the considerable indefiniteness of wireless physical channels, it does not necessarily mean that the reassignment fails even if the input bit stream, both being bit-inverted and not being bit-inverted, can not be correctly decoded. Therefore, it is more reliable to observe a ratio of correctly decoding the bit-inverted bit streams within a time period through utilizing reassigned traffic channel configuration, or to observe a ratio of correctly decoding not-bit-inverted bit streams within a time period through utilizing previous traffic channel configuration. For example, it may be determined that the reassignment fails if the number of messages which are received from the terminal and which are correctly decoded within a predetermined time period by the BS through utilizing the reassigned traffic channel configuration is smaller than a first predetermined threshold, or if the number of messages which are received from the terminal and which are correctly decoded within a predetermined time period by the BS utilizing previous traffic channel configuration is larger than a second predetermined threshold. For example, it is determined that the reassignment fails and the terminal maintains the traffic channel configuration used prior to the reassignment if the ratio of correctly decoding the bit-inverted bit streams through utilizing reassigned traffic channel configuration is lower than 30% within 3 frames or the ratio of correctly decoding the not-bit-inverted bit streams through utilizing previous traffic channel configuration is larger than 50% within 3 frames.

Figure 5:
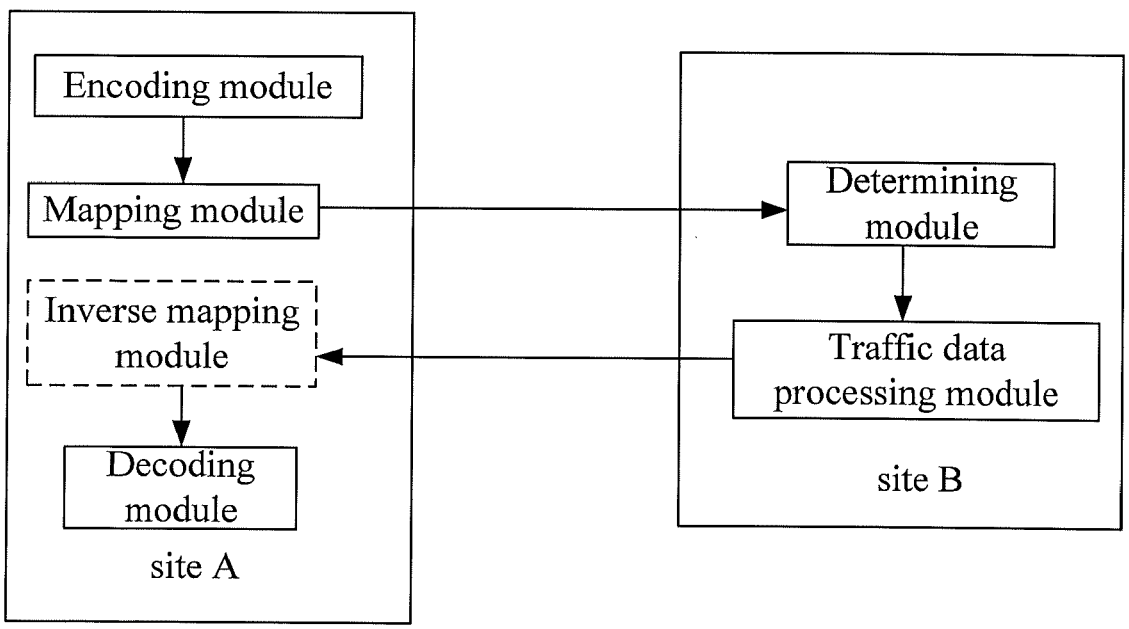
FIG. 5 is a schematic illustrating a structure of a system for reassigning traffic channel configuration in accordance with an embodiment of the present invention.

Embodiments of the present invention also provide a system for reassigning traffic channel configuration. FIG. 5 is a schematic illustrating a structure of a system for reassigning traffic channel configuration in accordance with an embodiment of the present invention. As shown in FIG. 5, the system includes a site A and a site B. The site A is adapted to transmit a reassignment message to the site B, where the reassignment message carries reassigned traffic channel configuration; process traffic data received from the site B, determine whether the traffic data received is correct to determine whether the reassignment message is correctly received by the site B. The site B is adapted to determine whether the site B correctly receives the reassignment message, process the traffic data according to a determining result and transmit the traffic data after processed to the site A.

According to an embodiment of the present invention, the site A may include: an encoding module and a mapping module. The encoding module is adapted to encode a reassignment message which is to be transmitted to the site B. The mapping module is adapted to map the encoded reassignment message utilizing a mapping function, such as YA(SA), and transmit the mapped reassignment message to the site B. The site A may further include an inverse mapping module and a decoding module. The inverse mapping module is adapted to perform inverse mapping on traffic data received from the site B, e.g. perform the inverse mapping (such as bit inversion) through utilizing a function of $YA^{-1}(SA)$. The decoding module is adapted to decode traffic data which are processed through the inverse mapping, determine whether the traffic data decoded is correct to determine whether the site B has correctly received the reassignment message, specifically, determine that the site B has correctly received the reassignment message if the traffic data decoded is correct. Certainly, the site A does not necessarily include the inverse mapping module. In this case, the traffic data received from the site B may be directly decoded by the decoding module, and whether the site B has correctly received the reassignment message is determined through determining whether the decoded traffic data is correct. To be specific, it may be determined that the site B has not correctly received the reassignment message if the decoded traffic data is correct.

According to an embodiment of the present invention, the site B may include a determining module and a traffic data processing module. The determining module is adapted to determine whether the site B has correctly received a reassignment message. The traffic data processing module is adapted to process traffic data according to a determining result from the determining module, and transmit the processed traffic data to the site A. To be specific, if the site B has correctly received the reassignment message, the traffic data processing module is adapted to encode the traffic data and map the encoded traffic data (e.g. perform bit inversion), and transmit the mapped traffic data to the site A. If the site B has not received the reassignment message or the reassignment message received is incorrect, the traffic data processing module is adapted to process the traffic data in an existing manner.

In other embodiments of the present invention, the site A may be a base station, and the site B may be a terminal.

In conventional wireless communication systems, when a base station needs to reassign traffic channel configuration, the base station has to confirm with a terminal utilizing a hand-shake manner, and the reassignment failure may occur when an acknowledge message sent by the terminal is lost or damages due to environmental impacts. Compared with conventional wireless communication systems, the method and system provided by embodiments of the present invention, a base station is enabled to determine whether a terminal has correctly received a reassignment message without the terminal submitting an acknowledge message, which facilitates the communication between the two parties. Thus, according to embodiments of the present invention, two parties are enabled to reassign channels in a more reliable manner without transmitting an acknowledgement message, which facilitates fluent communication between two parties.

The foregoing description is only preferred embodiments of the present invention and is not for use in limiting the protection scope thereof. All the modifications, equivalent replacements or improvements in the scope of the present invention's sprit and principles shall be included in the protection scope of the present invention.

What claimed is:

1. A method for reassigning traffic channel configuration, applicable to reassigning traffic channel configuration between a site A and a site B with the reassignment being initiated by the site A, comprising steps of:

transmitting, by the site A, a reassignment message containing reassigned traffic channel configuration to the site B;

determining, by the site B, whether the site B correctly receives the reassignment message, processing traffic data according to a determining result and transmitting the traffic data processed to the site A;

processing, by the site A, the traffic data received, and determining whether the site B correctly receives the reassignment message through determining whether the traffic data are correct;

establishing, by the site A and the site B, communications with each other utilizing first traffic channel configuration, wherein a sate sequence number of the site A, SA, is the same as a state sequence number of the site B, SB;

performing, by the site A and the site B, channel coding on respective messages to be transmitted to each other to generate encoded messages, each encoded message including a message part and a code part;

mapping, by the site A and the site B, respective encoded messages utilizing functions of YA(SA) and YB(SB), and transmitting the mapped messages to each other, wherein the YA(SA) is a function of the SA and the YB(SB) is a function of the SB, and the YA(SA) and the YB(SB) are invertible mapping known by the site A and the site B; and performing, by the site A and the site B through utilizing functions of $YA^{-1}(SA)$ and $YB^{-1}(SB)$, inverse mapping on mapped messages received respectively, and then performing channel decoding on respective results of the inverse mapping;

wherein the step of transmitting by the site A the reassignment message to the site B comprises:

transmitting, by the site A to the site B through utilizing the first traffic channel configuration, the reassignment message which contains the reassigned traffic channel configuration for communication with the site B and which is processed through the channel coding and the mapping.

2. The method of claim 1, wherein the steps of determining by the site B whether the site B correctly receives the reassignment message, processing the traffic data according to the determining result, and transmitting the traffic data processed to the site A comprise:

performing, by the site B, channel coding and mapping on the traffic data if determining that the site B correctly receives the reassignment message after performing channel decoding and inverse mapping on the reassignment message; and transmitting, by the site B, the traffic data which are processed through the channel coding and the mapping to the site A;

wherein the steps of processing by the site A the traffic data received and determining whether the site B correctly receives the reassignment message through determining whether the traffic data are correct comprise:

performing, by the site A, inverse mapping and decoding on the traffic data received, determining whether the traffic data are correctly decoded by the site A, and determining that the site B correctly receives the reassignment message if the traffic data are correctly decoded; or, decoding, by the site A, the traffic data received, and determining that the site B fails to correctly receive the reassignment message if the traffic data are correctly decoded by the site A.

3. The method of claim 2, further comprising:

reusing, by the site A, the first traffic channel configuration to communicate with the site B, and changing the sequence number of the state of the site A, SA, into SA−1 if the number of messages which are received from the site B and are correctly decoded within a predetermined time period by the site A utilizing the reassigned traffic channel configuration is smaller than a first predetermined threshold or if the number of messages which are received from the site B and are correctly decoded within the predetermined time period by the site A utilizing the first traffic channel configuration is larger than a second predetermined threshold.

4. The method of claim 3, wherein the predetermined time period is time taken for interaction between the site A and the site B for 3 times.

5. The method of claim 2, further comprising:

performing, by the site B, the decoding and the inverse mapping on the reassignment message; if the site B correctly receives the reassignment message, changing a state of the site B, SB, into SB+1, and communicating, by the site B, with the site A utilizing the reassigned traffic channel configuration after a first time period determined in an agreement of the site A and the site B;

starting, by the site A, communications with the site B utilizing the reassigned traffic channel configuration after a second time period determined in an agreement between the site A and the site B.

6. The method of claim 1, further comprising:

performing, by the site B, the decoding and the inverse mapping on the reassignment message; if the site B correctly receives the reassignment message, changing a state of the site B, SB, into SB+1, and communicating, by the site B, with the site A utilizing the reassigned traffic channel configuration after a first time period determined in an agreement of the site A and the site B;

starting, by the site A, communications with the site B utilizing the reassigned traffic channel configuration after a second time period determined in an agreement between the site A and the site B.

7. The method of claim 6, wherein the first time period determined in an agreement of the site A and the site B is time taken for transmission from the site B to the site A for one time;

the second time period determined in an agreement of the site A and the site B is time taken for transmission from the site A to the site B for one time plus time taken for transmission from the site B to the site A for one time.

8. The method of claim 6, further comprising:

reusing, by the site A, the first traffic channel configuration to communicate with the site B, and changing the sequence number of the state of the site A, SA, into SA−1 if the number of messages which are received from the site B and are correctly decoded within a predetermined time period by the site A utilizing the reassigned traffic channel configuration is smaller than a first predetermined threshold or if the number of messages which are received from the site B and are correctly decoded within the predetermined time period by the site A utilizing the first traffic channel configuration is larger than a second predetermined threshold.

9. The method of claim 1, wherein the channel coding is Reed-Solomon RS coding.

10. The method of claim 1, wherein the YA(SA) and the YB(SB) are the same function;

if the SA or the SB is an odd number, the mapping comprises: keeping the message part of the encoded message unchanged and inverting each bit in the code part of the encoded message, or keeping the code part of the encoded message unchanged and inverting each bit in the message part of the encoded message;

if the SA or the SB is an even number, the mapping comprises: keeping both the message part and the code part of the encoded message unchanged.

11. The method of claim 1, wherein the site A is a base station, and the site B is a terminal.

12. A system for reassigning traffic channel configuration, comprising a site A and a site B, wherein the site A is adapted to transmit to the site B a reassignment message containing reassigned traffic channel configuration; process traffic data from the site B and determine whether the site B correctly receives the reassignment message through determining whether the traffic data received is correct;

the site B is adapted to determine whether the site B correctly receives the reassignment message, process the traffic data according to a determining result, and processed transmitting the traffic data to the site A, wherein;

the site A comprises:

an encoding module, a mapping module and a decoding module; wherein the encoding module is adapted to encode the reassignment message to be transmitted to the site B, the mapping module is adapted to map the encoded reassignment message utilizing a mapping function of YA(SA), and transmit the mapped reassignment message to the site B;

the decoding module is adapted to decode the traffic data, and determine whether the site B correctly receives the reassignment message through determining whether the decoded traffic data are correct, wherein;

the site A further comprises:

an inverse mapping module, adapted to perform inverse mapping on the traffic data according to a function of $YA^{-1}(SA)$ and transmit the traffic data which is inversely mapped to the decoding module; wherein the decoding module decodes the traffic data which is inversely mapped, determines whether the site B correctly receives the reassignment message through determining whether the decoded traffic data are correct, wherein;

the site B comprises:

a determining module and a traffic data processing module;

wherein the determining module is adapted to determine whether the site B correctly receives the reassignment message;

the traffic data processing module is adapted to receive a result from the determining module; if the result is that the site B correctly receives the reassignment message, encode the traffic data, map the encoded traffic data utilizing a function of YB(SB), and transmit the mapped traffic data to the site A.

* * * * *